Feb. 5, 1952   R. W. KISSINGER ET AL   2,584,354
METHOD OF SEALING A GLASS FACING TO A SURFACE OF A METAL BODY
Filed Jan. 11, 1951
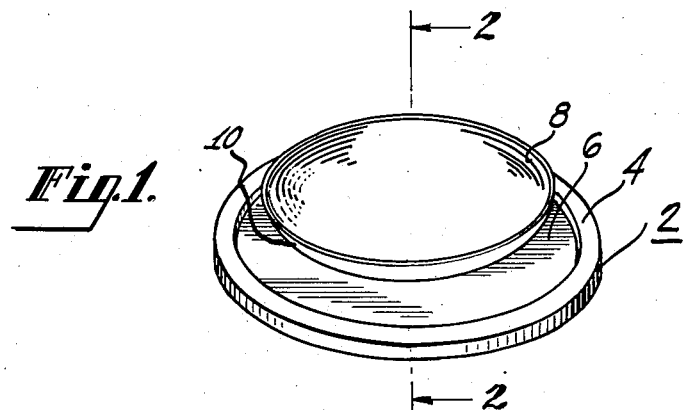
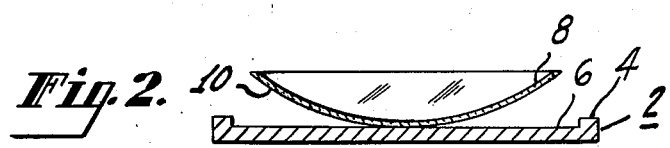
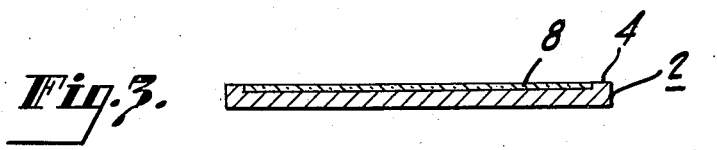
INVENTORS
ROBERT W. KISSINGER &
RICHARD D. FAULKNER
BY
ATTORNEY Patented Feb. 5, 1952

2,584,354

UNITED STATES PATENT OFFICE 2,584,354

METHOD OF SEALING A GLASS FACING TO A SURFACE OF A METAL BODY

Robert W. Kissinger, State College, and Richard D. Faulkner, Lancaster, Pa., assignors to Radio Corporation of America, a corporation of Delaware Application January 11, 1951, Serial No. 205,556

7 Claims. (Cl. 49—81)

This invention relates generally to the sealing of glass to metal and, more particularly, to sealing a glass facing to a relatively larger area surface of a metal body.

Good techniques have previously been perfected for sealing metal pins or wires to glass in an airtight manner. Such techniques have made possible the mass production of countless millions of electric light bulbs and vacuum tubes, for example.

It has also frequently been desired to seal fairly large surface areas of metal to glass. For instance, in making a metal cone kinescope television tube, the periphery of the glass face plate must be integrally joined to the open end of the metal cone.

Although the making of large size metal cone kinescope tubes is rather difficult because of the relatively large amounts of glass and metal which must be evenly heated in order that sealing may be successfully effected, a still more difficult problem is one in which it is desired to provide a relatively large flat surface area of metal with a glass facing.

A particular application where the problem of sealing relatively large area surfaces of metal and glass is encountered is that of making a molding platen having a metal backing and a glass surface. In molding certain plastic parts, such as precision optical lenses, it is necessary that the surface of the mold platen be given an optical polish of a high degree of smoothness and accuracy. Chrome plated surfaces have usually been used for this purpose but even they can be given a perfect optical finish and accurate curvatures only with great difficulty. Because of the difficulty of giving a perfect optical surface to a metal body, it has previously been proposed to make the surface of the mold platen of glass. Compared to metals, glass is relatively easy to grind and polish. However, a mold platen cannot be made entirely of glass when high molding pressures and temperatures are required. Consequently, it has been proposed to make a mold platen having a backing plate of metal and a surface of glass.

One of the problems that naturally presents itself in making a mold platen having a metal backing and a glass surface is that of joining the glass to the metal. High temperatures are encountered in molding processes so that cements cannot be used. Then, too, because glass is not a particularly good conductor of heat, and mold platens are subject to rapid heating and cooling cycles, the glass facing must be kept relatively thin, thus ruling out many methods of clamping. It, therefore, becomes necessary to make a mold platen of this type by integrally sealing the glass to the metal.

Many attempts have previously been made to accomplish the sealing of the relatively large area glass surface to the metal backing plate but these trials have usually resulted in having one or more imperfections in the product, such as gas bubbles trapped at the interface between the metal and the glass.

One object of the present invention is to provide an improved method of providing a relatively large area surface of a metal body with a glass facing.

Another object of the invention is to provide an improved method of sealing a glass facing plate to a metal surface of relatively large area without entrapment of gas bubbles at the glass-metal interface.

Another object of the invention is to provide an improved mold platen having an optically polished glass surface.

Still another object of the invention is to provide an improved article comprising a metal backing plate and a glass facing plate integrally sealed thereto.

These and other objects will be more apparent and the invention will be more readily understood from the following detailed description and the accompanying drawings, of which:

Figure 1 is a perspective view of an assembly comprising a metal body and a glass plate in position to be sealed to the surface of the body in accordance with the method of the present invention, Figure 2 is a cross section view taken through the line 2—2 of Figure 1, and Figure 3 is a cross section view similar to that of Figure 2 at the completion of the process of the present invention.

In general, the improved process of the present invention comprises conditioning the surface of a metal body which is to be provided with a glass facing, placing against the conditioned metal surface the convex surface of a glass plate of arcuate cross section, and then heating both the metal body and the glass plate to the softening temperature of the glass until the glass plate reclines to the contours of the metal surface and becomes sealed thereto.

A more detailed example of the method will now be given with reference to the illustrative drawings.

Example

A disc 2 of a chrome-iron alloy, such as one consisting essentially of 17-28% chromium and the balance substantially all iron except for less than 1% of a stabilizer, such as aluminum, may be provided with a glass facing as follows. The metal may first be removed to a depth of about 1/8" to 3/16" from the entire surface of the disc except a narrow band around the periphery which is permitted to remain as a containing rim 4. The surface of the depressed area 6 is then prepared to receive the glass. It is first sandblasted and degreased to expose a fresh surface and remove surface contamination. It may then be provided with an even oxide coating by any one of several methods. For example, it may be heated to about 800° C. in an oxygen-containing atmosphere or it may be heated in a hydrogen atmosphere in the presence of water vapor. The oxide coated metal may then be heated at about 1200° C. in a nitrogen or other neutral or inert atmosphere to outgas the metal. After completion of the outgassing process, the metal is cooled at least sufficiently to permit starting the next step of the process.

The glass which is to be sealed to the metal disc is in the form of a watch glass 8 having an arcuate cross section. It may also be described as having a concavo-convex or meniscus shape. The glass may be of any usual type composition such as ordinary window glass of the soda-lime-silica variety. The thickness of the glass is not critical but, for making a mold platen which is subject to rapid heating and cooling cycles, it is preferably relatively small. Glass having a thickness of 1/8" to 3/16" has been found suitable.

In order to avoid the effect of strains at the metal-glass interface due to unequal contraction and expansion, it is preferable that the glass and the metal backing plate have substantially the same coefficients of expansion.

The convex side 10 of the glass plate is carefully cleaned and is then centered on the oxide-coated surface 6 of the metal disc. In the case of making a mold platen, the dimensions of the glass are chosen so that the glass will finally occupy all of the depressed portion of the disc. The assembly is then heated to 1100° C. for about 1 hour, during which time the glass reclines to the contours of the surface of the metal plate and becomes integrally sealed thereto.

It has been found that, by using the method described, good seals can be made without entrapment of gas bubbles. Many previous attempts had been made using flat plates of glass but imperfect seals were always obtained due to presence of gas bubbles at the metal-glass interface.

The degree of curvature of the glass plate prior to heating is not critical. The curvature should be such, however, that the area of contact is small when the convex surface of the glass rests on the metal surface. The type of curvature also is not important. Glass having any curvature configuration such as spherical or parabolic, for example, is suitable.

Any metal of the type commonly used for sealing to glass may be used as the backing plate metal. It is only necessary that the metal be given an oxide coating and that a glass is selected having about the same coefficient of expansion as the metal. Examples of other suitable metals are alloys consisting essentially of: 42% nickel, 4.5% chromium, and the rest iron; 16% cobalt, 29% nickel, and the rest iron; 18% cobalt, 29% nickel, and the rest iron.

The completed article may be used for any desired purpose. As previously indicated, the glass surface may be ground and optionally polished to serve as a molding platen for making plastic lenses or the surface may be silvered or aluminized to become an excellent front surfaced mirror.

We claim as our invention:

1. A method of providing a relatively large area surface of a metal body with a glass facing comprising cleaning said surface, providing said cleaned surface with an oxide coating, outgassing said coated surface, placing against said surface the convex surface of a glass plate of arcuate cross section, and heating both said body and said plate to the softening temperature of said glass until said plate reclines to the contours of said surface and becomes sealed thereto.

2. A method according to claim 1 in which said metal is a chromium-iron alloy.

3. A method according to claim 2 in which said glass has about the same coefficient of expansion as said alloy.

4. A method according to claim 3 in which said glass is a soda-lime-silica glass.

5. A method of providing a relatively large area surface of a metal body with a glass facing comprising cleaning said surface, firing said body in an oxygen atmosphere to obtain an even oxide coating on said surface, firing said body in a neutral atmosphere to outgas said metal, placing against said surface the convex surface of a glass plate of arcuate cross section, and heating both said body and said plate to the softening temperature of said glass until said plate reclines to the contours of said surface and becomes sealed thereto.

6. In a method of providing a relatively large area oxide coated surface of a metal body with a glass facing, the steps of placing against said surface the convex side of a glass plate of arcuate cross section, and heating both said body and said plate to the softening temperature of said glass until said plate reclines to the contours of said surface and becomes sealed thereto.

7. A method according to claim 6 in which said metal surface is substantially plane and horizontal.

ROBERT W. KISSINGER.
RICHARD D. FAULKNER.

No references cited.